United States Patent [19]

Akiyoshi

[11] Patent Number: 5,668,812
[45] Date of Patent: Sep. 16, 1997

[54] APPARATUS FOR DETECTING AND CONTROLLING LOSS OF ATM CELL

[75] Inventor: Hitomi Akiyoshi, Kawasaki, Japan

[73] Assignee: Fujitsu Limited, Kanagawa, Japan

[21] Appl. No.: 530,874

[22] Filed: Sep. 20, 1995

[30] Foreign Application Priority Data

Dec. 28, 1994 [JP] Japan .................. 6-327158

[51] Int. Cl.$^6$ .................. H04Q 11/04
[52] U.S. Cl. .................. 370/474
[58] Field of Search .................. 370/60, 94.1, 60.1, 370/61, 77, 99, 229, 230, 235, 236, 253, 395, 396, 397, 398, 399, 401, 474

[56] References Cited

U.S. PATENT DOCUMENTS 5,513,191  4/1996  Takechi et al. .................. 370/13
5,528,590  6/1996  Iidaka et al. .................. 370/60.1

OTHER PUBLICATIONS

McDysan and Spohn, ATM: Theory and Application, McGraw Hill 1994.

*Primary Examiner*—Douglas W. Olms
*Assistant Examiner*—Matthew C. Phillips
*Attorney, Agent, or Firm*—Helfgott & Karas, P.C.

[57] ABSTRACT

An ATM switching system has a receiving unit for receiving an ATM cell, reassembling it into a frame and temporarily storing a buffer memory with this frame. When the receiving unit receives the cell, there is discriminated whether the cell is a continuous in-receipt cell or a last cell. A cell-to-cell receiving time or a receiving time between a head cell and the last cell is monitored. When this receiving time exceeds a set time, a determination is that the cell loss is detected. Invalid holding of a buffer memory is restrained by releasing the buffer memory.

8 Claims, 13 Drawing Sheets

APPARATUS FOR DETECTING AND CONTROLLING LOSS OF ATM CELL

BACKGROUND OF THE INVENTION

The present invention relates to an ATM cell loss detecting and controlling apparatus in an ATM switching system for transferring an ATM cell.

An ATM (Asynchronous Transfer Mode) switching system is intended to transfer a cell having a 53-byte length including a 5-byte ATM header and a 48-byte data field and capable of performing a broad band transmission. According to this ATM switching system, it may happen that the cells are disposed of when the cells are lost or congregated. A desirable point in this system is that invalid holding or the like of a buffer memory is avoided by easily detecting such a cell loss.

The ATM switching system includes a plurality of ATM switching equipments interposed between a terminal device on a transmitting side and a terminal device on a receiving side, and pieces of data are stored in a packet known as a cell and thus transferred. The cell in that case is constructed of the 5-byte ATM header containing a virtual path identifier (VPI), a virtual channel identifier (VCI), a payload type (PT) and a cell loss priority indication (CLP) and the 48-byte data field containing pieces of data, etc.

Further, the ATM switching equipment performs a routing process on the basis of the virtual path identifier (VPI) and the virtual channel identifier (VCI). Also, when the cells are concentrated on the same route enough to be congregated, the cells are disposed of on the basis of headers, a quality-of-request-communication (QOS) and the cell loss priority indication (CLP) of the ATM header. Further, if an error is caused in the virtual path identifier (VPI) or the virtual channel identifier (VCI) of the ATM header due to a transfer error on an ATM line, there is brought about a loss of the ATM cell enough to make the data untransferable to a target terminal.

An ATM adaptation layer (AAL) can be roughly classified into a cell segmentation/administration/reassembly sublayer (SAR) in which the cell is segmented and reassembled and into a convergence sublayer (CS) in which frame error control and flow control are conducted. AAL types 1–5 are defined, and among these types, the AAL type 3 is of a connection type, while the AAL type 4 is of a connectionless type. A head cell or an intermediate cell or a last cell or a sole cell can be represented by a segment type (ST). Further, the AAL type 5 is of the connection type, and a function of the above segment type (ST) substitutes for the payload type (PT) of the ATM header.

Accordingly, on a receiving side, the segment type (ST) or the payload type (PT) is identified, and it is possible to discriminate whether the received cell is the last cell or not. Further, on the receiving side, the received ATM cell is segmented into the data field and the ATM header, and a frame is constructed by use of the data field. For this purpose, a buffer memory is provided, and the last cell is received, thus completing a receipt of a series of data. Hence, it follows that the reassembled frame in the buffer memory is transferred to a processing unit posterior thereto.

As explained above, in case the loss of the ATM cell is caused, and if this is a loss of an arbitrary number of intermediate cells among a plurality of intermediate cells which are indicated by the segment type (ST) or the payload type (PT), the loss thereof can be detected by final frame checking, and it follows that a retransmitting process based on a high-order application is to be executed.

This kind of retransmitting process is, however, very time-consuming, and, meanwhile, it is required that areas of the buffer memory be secured.

Further, if the last cell is lost, the receipt does not come to an end forever, and, hence, the areas of the buffer memory remain secured. This conduces to a problem in which an invalid holding state of the buffer memory happens often.

The present invention aims at providing a technology capable of detecting the loss of the ATM cell by a comparatively simple process.

SUMMARY OF THE INVENTION (1) An ATM cell loss detecting/controlling apparatus according to the present invention comprises a control unit for actualizing a fixed function in an ATM switching system including a receiving unit for receiving an ATM cell, reassembling it into a frame and temporarily storing a buffer memory with this frame. More specifically, this control unit, when the receiving unit receives the cell, discriminates whether the received cell is a continuous in-receipt cell or a last cell and monitors a cell-to-cell receiving time or a receiving time between a head cell and the last cell. The control unit, when this receiving time exceeds a set time, determines that a loss of the cell is detected, and the buffer memory is released. Accordingly, invalid holding of the buffer memory is eliminated.

(2) Further, the control unit identifies a cell indicating a head cell or an intermediate cell or a last cell by a segment type (ST) in a header of a cell segmentation and reassembly sublayer-protocol data unit (SAR-PDU) of an ATM adaptation layer (AAL). Then, the control unit monitors a cell-to-cell receiving time till the last cell is identified since the head cell has been identified and, even if over the set time, determines that the cell loss is detected when a next cell can not yet be received. The control unit thus performs the control to release the buffer memory 2. For this purpose, the control unit may be provided with a monitor table for storing a timer value and the received cell as well.

(3) Additionally, the control unit receives a cell indicating the head cell or the intermediate cell or the last cell by the segment type (ST) in the header of the cell segmentation and reassembly sublayer-protocol data unit (SAR-PDU) of the ATM adaptation layer (AAL) and, even if over a last cell receivable set time since the head cell has been received, determines that the cell loss is detected when the last cell can not be received. The buffer memory is therefore released.

(4) Further, the control unit determines a set time on the basis of a buffer allocation size indication (BASize) in a header of a common part convergence sublayer-protocol data unit (CPCS-PDU) and, even if over this set time, determines that the cell loss is detected when a receipt completion can not be done upon receiving the last cell. The buffer memory is therefore released. That is, the buffer allocation size indication (BASize) shows an effective data length, and it is therefore possible to estimate a time needed till the last cell is received since the head cell has been received in the case of being celluarized. Accordingly, a set time such as a timer value of the monitor table is determined based on this buffer allocation size indication (Basize). The control unit, even if over this set time, determines that the cell loss is detected when the last cell can not be received and therefore releases the buffer memory.

(5) Furthermore, the control unit monitors a cell-to-cell receiving time till a user-to-user indication by the payload type (PT) of the ATM header of the cell shows the last cell and, even if over the set time, determines that the cell loss is detected when the next cell can not be received. The control unit performs the control to release the buffer memory.

(6) Also, the control unit monitors a receiving time till the last cell is indicated since the user-to-user indication by the payload type (PT) of the ATM header of the cell has shown a continuance cell and, even if over the set time, determines that the cell loss is detected when the last cell can not be received. The buffer memory is therefore released.

(7) Further, the control unit determines that the cell loss is detected and performs the control to release the buffer memory. The control unit also notifies a cell transmitting party of an abnormality in terms of receiving through an operation, administration and maintenance cell (OAM).

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

The principle of detecting and controlling a loss of ATM cell according to the present invention will be discussed with reference to FIG. 1.

According to the present invention, a control unit 1 stores a buffer memory 2 with data and releases the same memory. The control unit 1 also controls a cell segmentation-and-reassembly unit 4 and an interface unit 5 as well.

The cell received via the interface unit 5 is segmented into an ATM header and data fields by the cell segmentation-and-reassembly unit 4, and it follows that a frame is assembled based on the data field through the buffer memory 2.

Further, a monitor table 3 has a status part for setting whether in a reassembling process or not and a timer value part for setting a time for monitoring the received cell, which parts can be formed as areas corresponding to, e.g., a VPI (Virtual Path Identifier) and a VCI (Virtual Channel Identifier).

The control unit 1 monitors the received cell by use of the monitor table 3 and determines whether or not a time ranging from a receipt of the heading cell to a receipt of the last cell or an inter received-cell time exceeds a set time based on a timer value. If over the set time, the control unit 1 determines that a cell loss is detected and releases the buffer memory 2. The timer value in this case can be set as a count value corresponding to a maximum allowable time between the received cells or a maximum allowable time from the receipt of the heading cell to the receipt of the last cell. Also, in case the monitor table 3 is formatted corresponding to the VPI and VCI, it follows that areas corresponding to the VPI and VCI are secured in the buffer memory 2, and, hence, there are released the areas of the buffer memory 2 that correspond to the VPI and VCI when determining that a cell loss is detected.

Further, the control unit 1 controls the cell segmentation-and-reassembly unit 4 to form an OAM (Operation, Administration and Maintenance) cell and transmits the OAM cell to a transmitting party via the interface unit 5. The transmitting party receives this OAM cell, recognizes an occurrence of the cell loss and performs a retransmitting process.

Figure 2A:
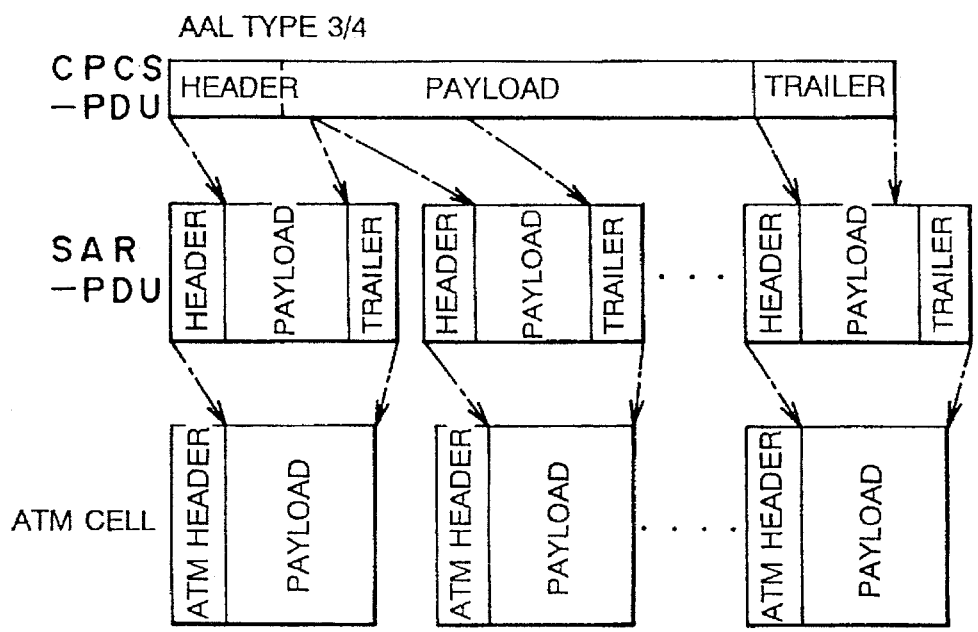
FIG. 2 is an explanatory diagram of an AAL type data flow.
Figure 2B:
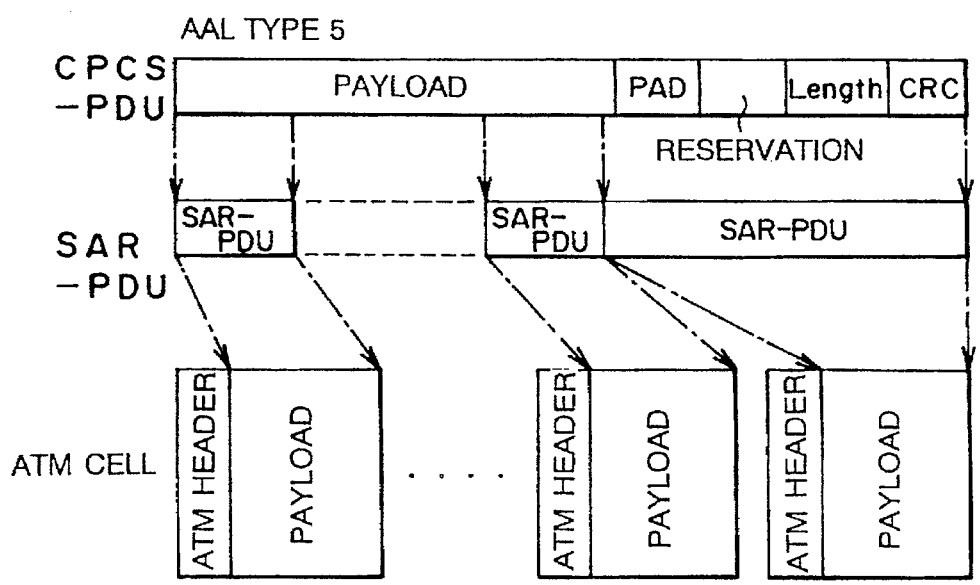

FIG. 2 is a diagram of assistance in explaining an ALL type data flow, wherein an AAL type 3 and an AAL type 4 of an ATM adaptation layer (AAL) structured the same as shown by an AAL type 3/4. A common part convergence sublayer-protocol data unit (CPCS-PDU) thereof comprises a header, a payload and a trailer. A segmentation and reassembly sublayer-protocol data unit (SAR-PDU) adds the header and the trailer to the payload into which the CPCS-PDU is segmented. An ATM cell is structured such that an ATM header is added to a payload that the header, the payload and the trailer of the SAR-PDU turn out to be.

Further, the CPCS-PDU in the case of the AAL type 5 consists of a payload, a padding (PD), a reservation part, an effective data length indication (Length) and a check bit (CRC), while SAR-PDU has such a structure that CPCS-PDU is segmented into 48 bytes. The ATM cell is structured such that the ATM header is added, with SAR-PDU serving as a payload.

Figure 3A:
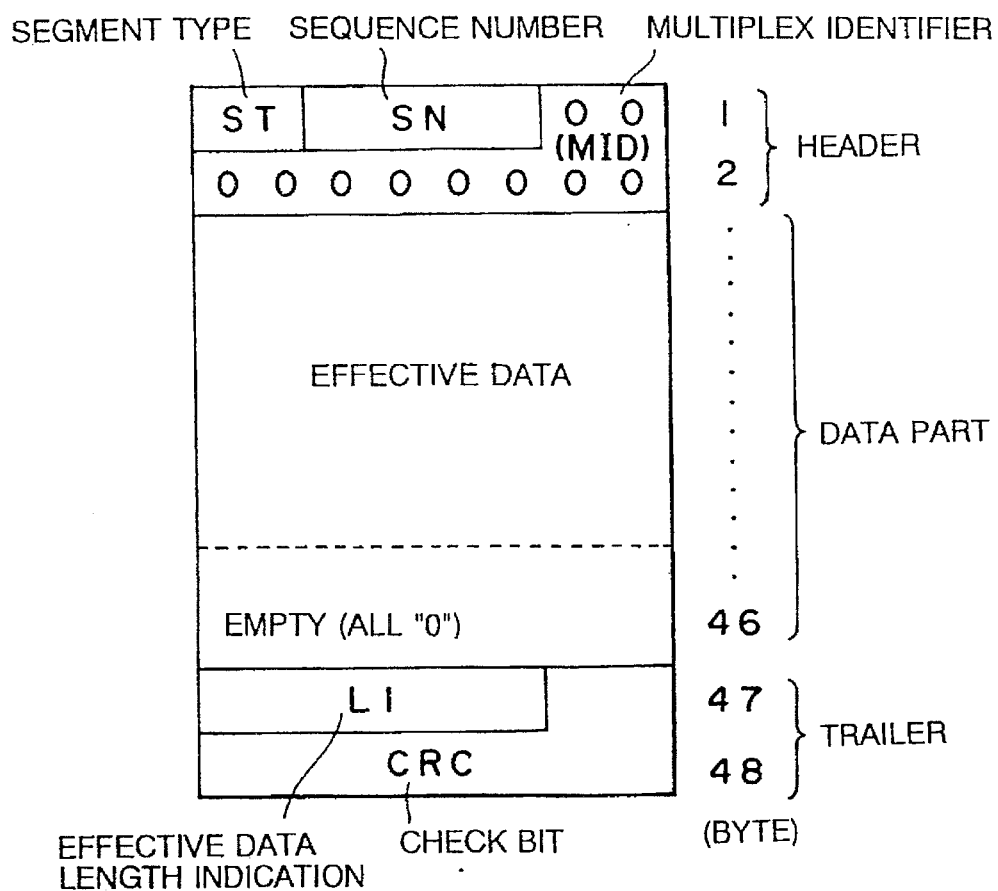
FIG. 3 is an explanatory diagram of an SAR-PDU format of an AAL type 3/4.
Figure 3B:
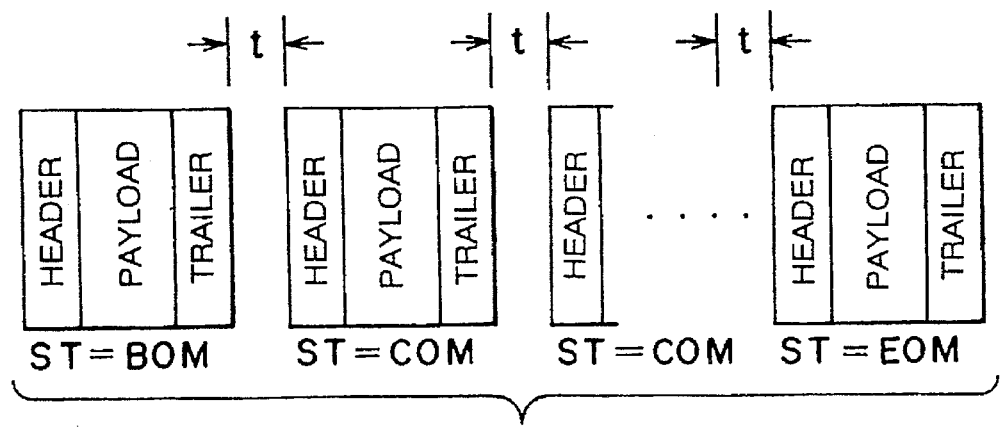

FIG. 3 is a diagram of assistance in explaining an SAR-PDU format of the AAL type 3/4, wherein SAR-PDU is based on a 48-byte structure consisting of a 2-byte header, a 44-byte data part and a 2-byte trailer. In this format, ST represents a segment type, SN designates a sequence number, MID denotes a multiplex identifier, LI represents an effective data length indication, CRC denotes a check bit, and an empty area is provided to add all "0" so that the data part comes to have totally 44 bytes when less than 44 bytes.

In the segment type ST, "10" indicates a head cell (BOM); "00" indicates an intermediate cell (COM); "01" indicates a last cell (EOM); and "11" indicates a sole cell (SSM). This segment type ST is identified in the control unit (see FIG. 1), thereby making it possible to determine whether the received cell is the head cell or the intermediate cell or the last cell.

Hence, the control unit 1 monitors a cell-to-cell receiving interval from a time when receiving and identifying the head cell (BOM) or a time from the receipt of the head cell (BOM) to the receipt of the last cell (EOM), thus detecting a cell loss.

For example, in SAR-PDU having a 48-byte length composed of the header, the payload and the trailer as illustrated below in FIG. 3, the head cell (BOM), the intermediate cell (COM) and the last cell (EOM) are expressed by the segment type ST. The ATM header is added to each head thereof, whereby they are transferred in the form of ATM cells. The control unit 1 manages the monitor table 3 in a corresponding-to-connection manner. The control unit 1 then sets an in-reassembly status (an in-use status of the buffer memory 2) in a status part of an area corresponding to an ATM cell receiving connection and also sets, in a timer value part, a timer value corresponding to a maximum receiving interval when operated normally.

This timer value is set smaller than a timeout for detecting an abnormal state due to a high-order application and is decremented with a fixed period. Then, the timer value is reset upon receiving a next ATM cell. Accordingly, in the case of a receiving interval t enough to receive the next ATM cell without exceeding a set time by the timer value, the determination is that there is no cell loss. When the set timer value is zeroized with the decrement, the determination is that the cell loss is detected. With this detection of the cell loss, the control unit 1 sends, as in the above-described way, the OAM cell to the transmitting party.

Figure 4A:
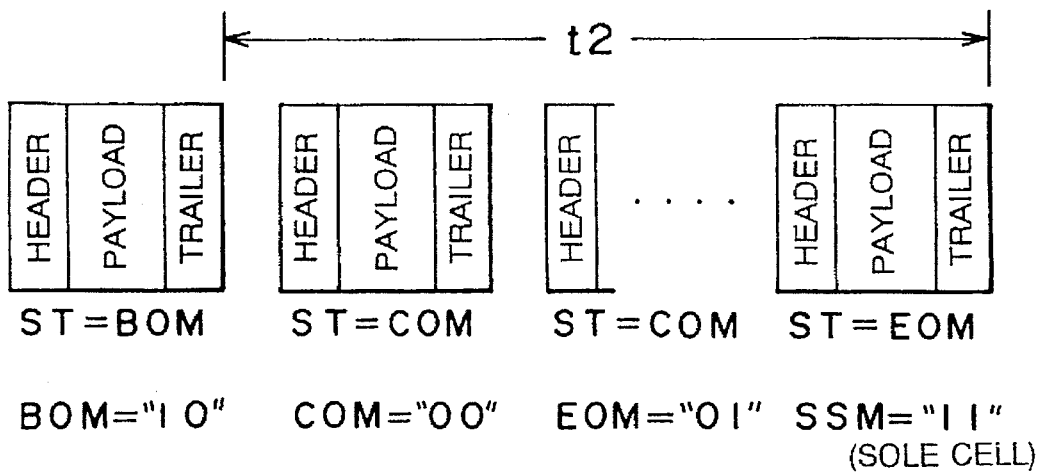
FIG. 4 is an explanatory diagram of SAR-PDU and CPCS-PDU of the AAL type 3/4.

FIG. 4 is a diagram of assistance in explaining CPCS-PDU and CPCS-PDU of the AAL type 3/4. In FIG. 4(A), as in the same way with SAR-PDU shown below in FIG. 3 given above, the head cell (BOM) or the intermediate cell (COM) or the last cell (EOM) can be indicated depending on the segment type ST of the header. Then, the control unit 1, if the maximum allowable time till the last cell (EOM) is received since the head cell (BOM) has been received is set to, e.g., t2, sets this as a set time t2 in the timer value part of the monitor table 3. The control unit 1 determines that the cell loss is detected when the last cell (EOM) is not received even if over this set time t2, i.e., when the receipt is not completed. At this time, the control unit 1, as described above, sends the OAM cell to the transmitting party.

Figure 4B:
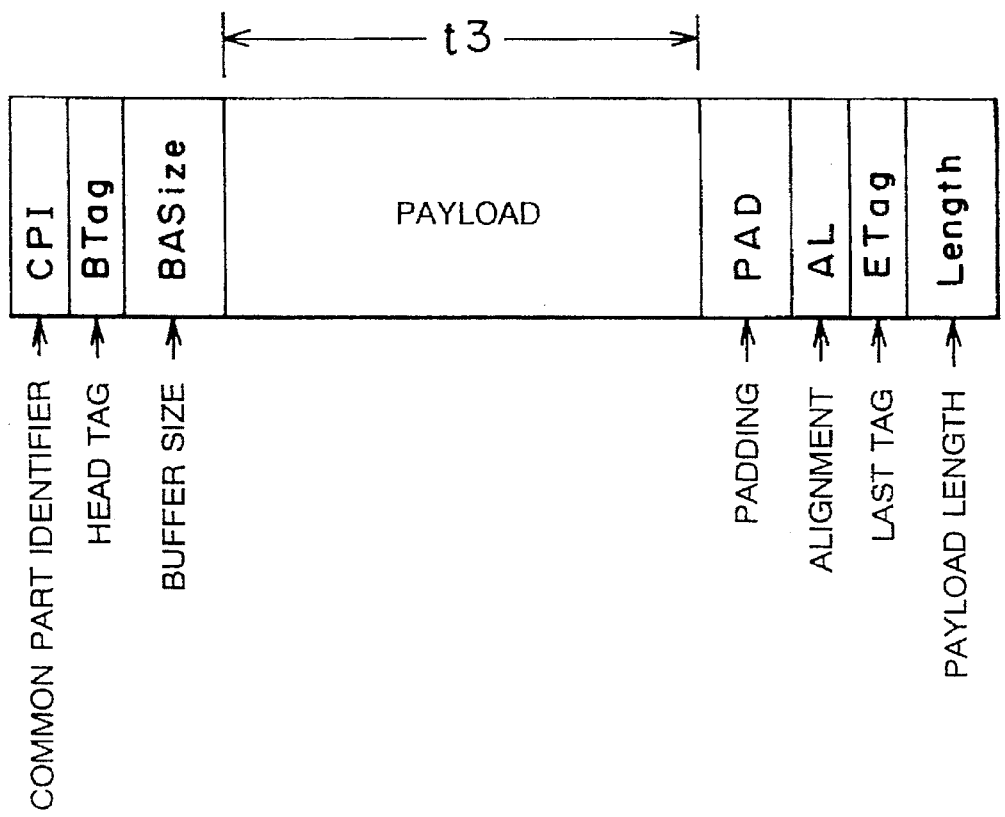

Further, FIG. 4(B) illustrates a format of CPCS-PDU, wherein the header thereof is constructed of a common part identifier (CPI), a head tag (BTag) and a buffer size (BASize), and the trailer is constructed of a padding (PAD), an alignment (AL), a last tag (ETag) and a payload length (Length). The buffer size (BASize) indicates a size of a buffer memory needed when received and has the same content as the payload length (Length) in a message mode. Then, this CPCS-PDU is, as illustrated in FIG. 2, transformed into SAR-PDU, and further the ATM headers are added to the payloads, thus transferring it as an ATM cell. Therefore, it is possible to obtain the maximum allowable time from the receipt of the head cell (BOM) to the receipt of the last cell (EOM) on the basis of a payload length t3, and this is set as a set time in the monitor table 3, whereby the cell loss can be detected in the control unit 1.

Figure 5:
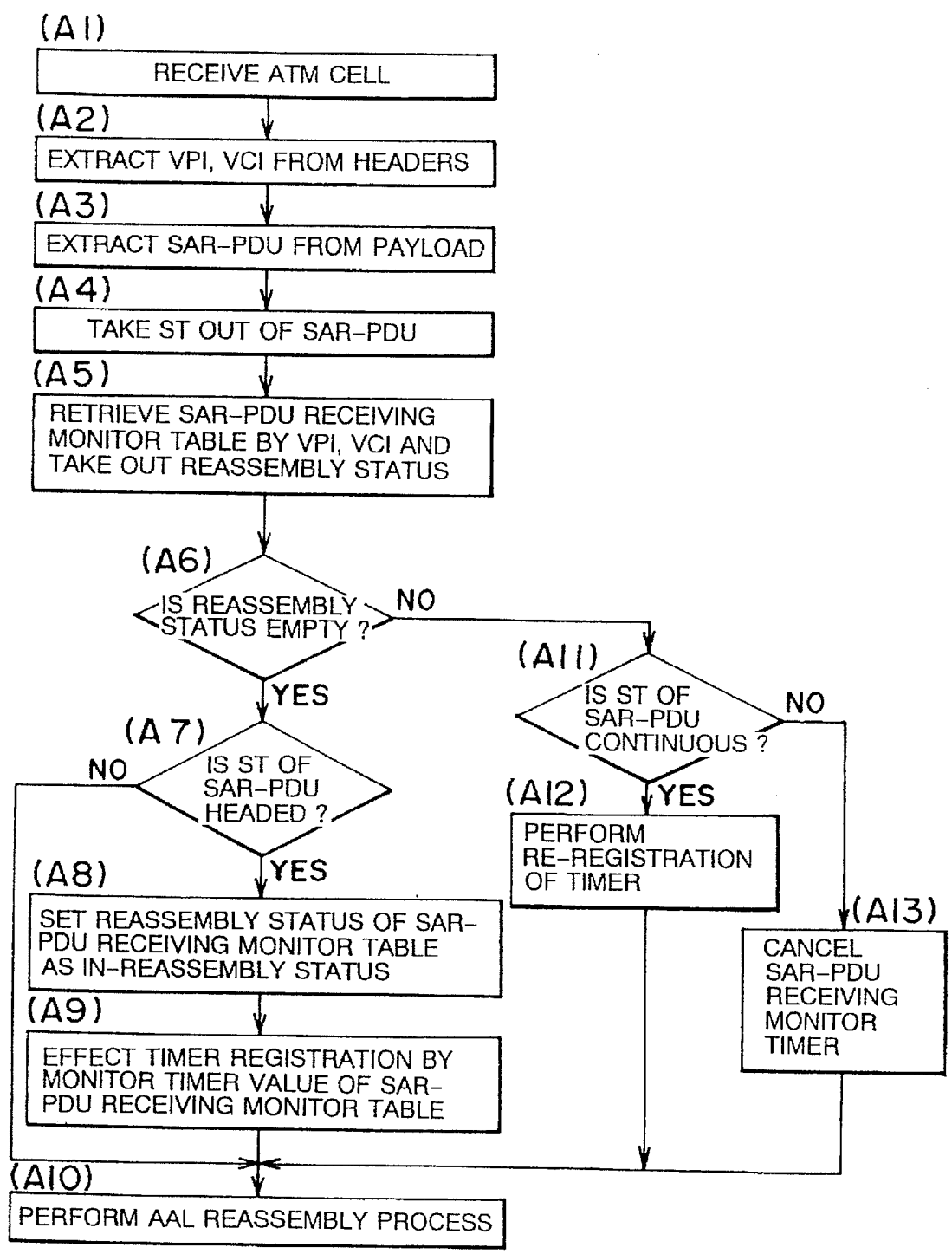
FIG. 5 is a flowchart in a first embodiment of the present invention.

FIG. 5 is a flowchart of a first embodiment of the present invention but illustrates a case where the segment type (ST) of the above-mentioned AAL type 3/4 is employed. A receiving unit receives the ATM cell (A1) and extracts VPI, VCI from the headers of the ATM cell (A2). The receiving unit then extracts SAR-PDU out of the payload (A3) (see FIG. 2) and takes ST out of this SAR-PDU (A4) (see FIG. 3).

Figure 1:
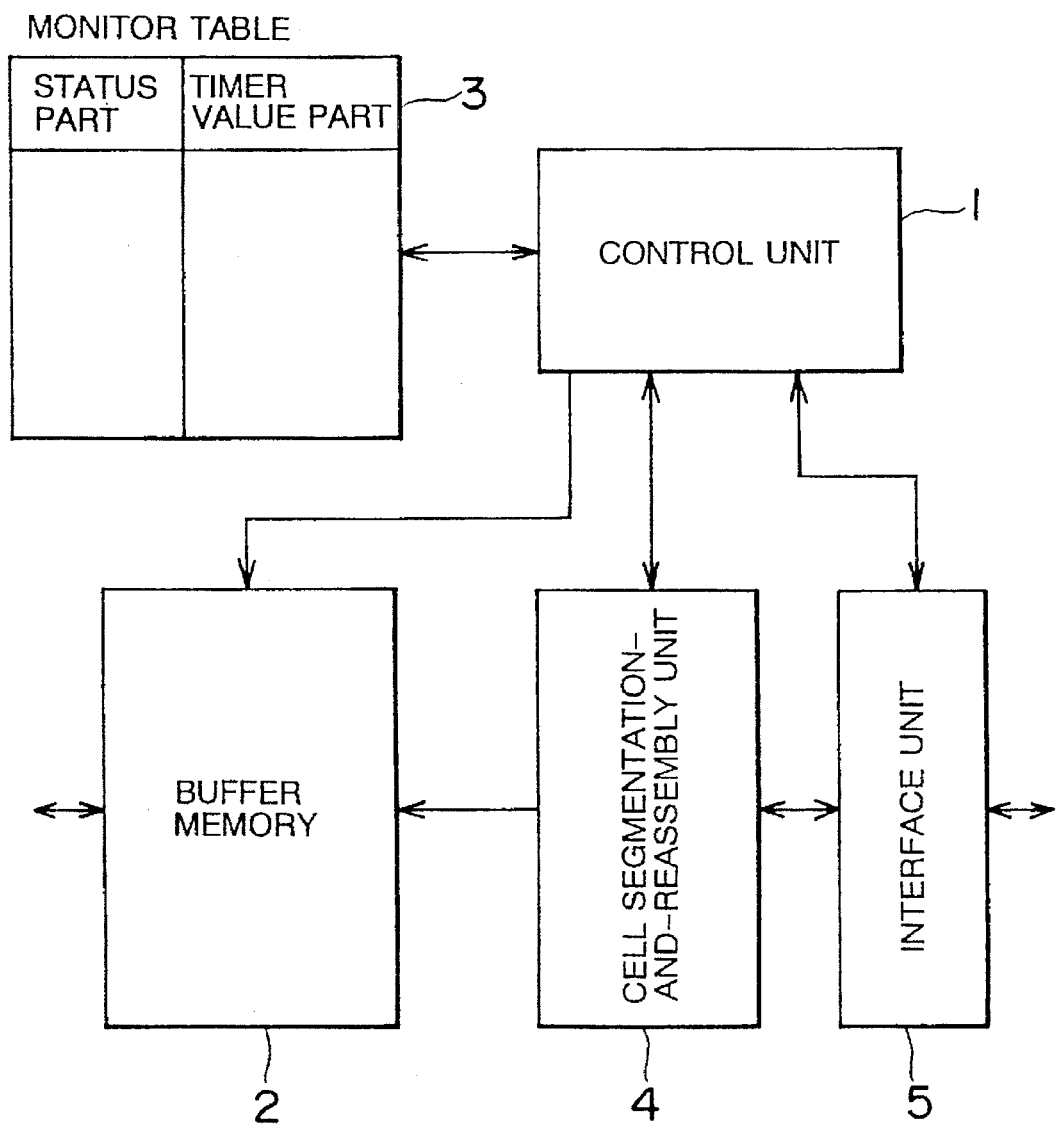
FIG. 1 is an explanatory diagram showing the principal portion in an embodiment of the present invention.

The control unit 1 retrieves an SAR-PDU receiving monitor table by use of VPI, VCI, i.e., the monitor table 3 in FIG. 1 and takes out a reassembly status (A5). That is, the control unit 1 reads status parts of the monitor table 3, which correspond to VPI, VCI of the ATM cell received. Checked subsequently is whether or not the reassembly statuses (corresponding-to-VPI/VCI areas of the buffer memory 2) are empty (A6). If empty, whether or not the segment type ST of SAR-PDU indicates the head cell is checked (A7). If not the head cell, an AAL reassembly process is carried out (A10).

Further, in the case of the head cell (BOM), the reassembly status of the SAR-PDU receiving monitor table is set in an in-reassembly status (A8). That is, the in-reassembly status is set in the status part of the monitor table 3. Then, a timer registration is performed based on a monitor timer value of the SAR-PDU receiving monitor table (A9). That is, a timer value corresponding to the maximum allowable time is set in the timer value part of the monitor table 3.

Further, when making a determination of not being the in-reassembly status in step (A6), whether or not the segment type ST of SAR-PDU indicates a continuance is checked (A11). That is, whether it is the intermediate cell (COM) or not is determined. If the intermediate cell (COM), a re-registration of the timer is effected (A12). That is, the timer value is reset in the timer value part of the monitor table 3. Further, if not the intermediate cell (COM), it is the last cell (EOM), and hence the SAR-PDU receiving monitor timer is canceled (A13). Namely, the timer value part of the monitor table 3 is cleared.

Figure 6:
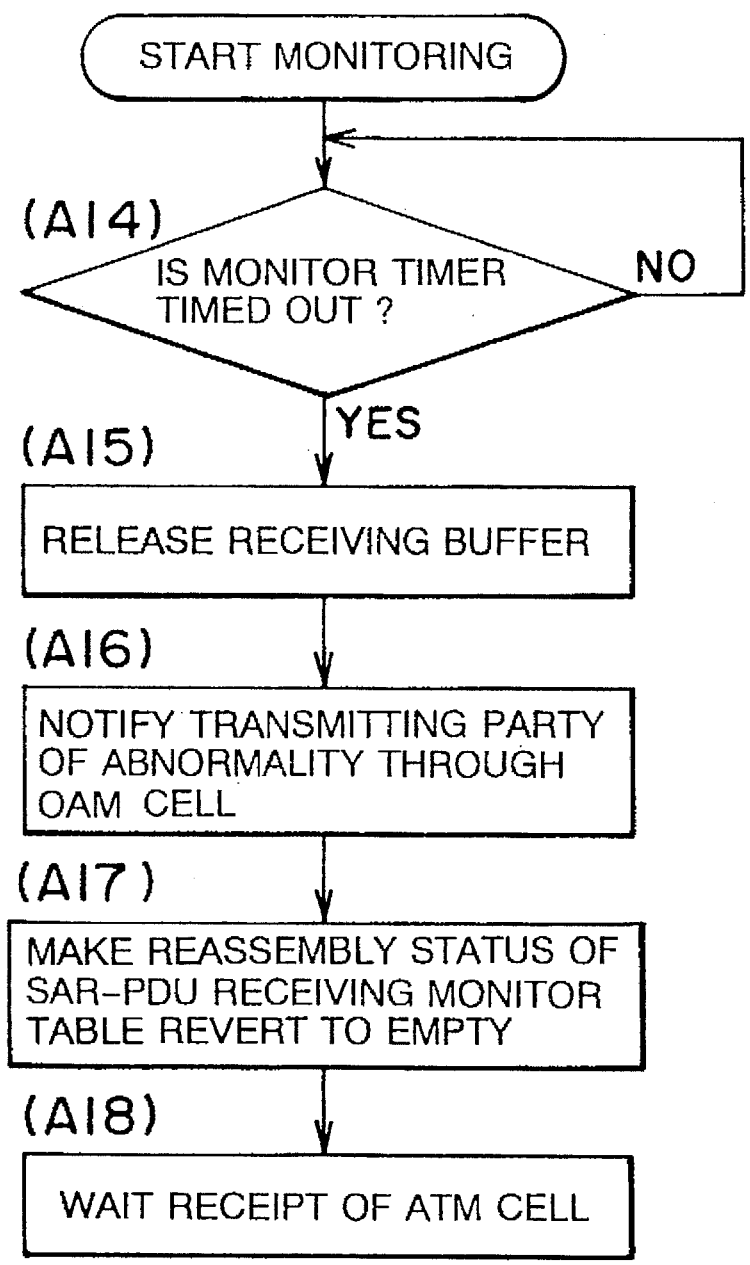
FIG. 6 is a flowchart when detecting a cell loss in the first embodiment of the present invention.

FIG. 6 is a flowchart when detecting the cell loss in the first embodiment of the present invention. Whether the monitor timer is timed out or not is checked (A14). That is, there is checked whether or not the timer value set in the timer value part of the monitor table 3 is zeroized by decrementing with a fixed period. If timed out, the receiving buffer is released (A15). The corresponding-to-VPI/VCI areas of the buffer memory 2 are thereby released.

Further, the control unit 1 notifies the transmitting party of an abnormal state through the OAM cell (A16). This OAM cell is not disposed of even when congregated in the ATM switching equipment but transferred to the transmitting party. Then, the reassembly status in the SAR-PDU receiving monitor table reverts to the empty status (A17). That is, the status part of the monitor table 3 is emptied, and there is a wait for receiving a next ATM cell (A18).

Accordingly, as illustrated below in FIG. 3, if the next cell can not be received within the maximum allowable time, this causes an overtime, and it follows that a loss of the cell when lost or disposed of is detected. Then, the transmitting party can be notified of the cell loss through the OAM cell.

Figure 7:
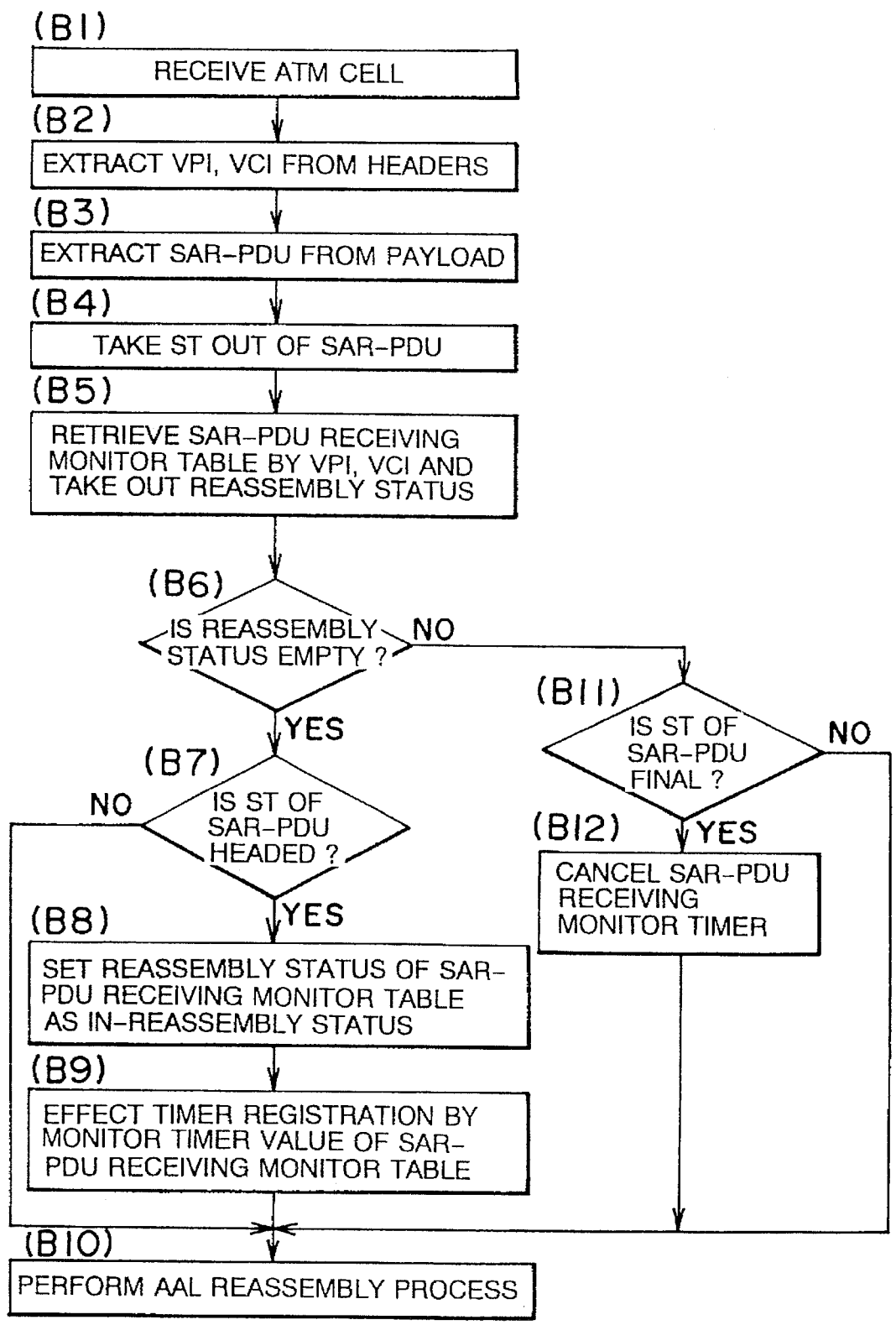
FIG. 7 is a flowchart in a second embodiment of the present invention.

FIG. 7 is a flowchart in a second embodiment of the present invention but shows a case where the segment type ST of SAR-PDU of the above-mentioned AAL type 3/4 is used. The receiving unit receives the ATM cell (B1) and extracts VPI, VCI from the headers of the ATM cell (B2). The receiving unit then extracts SAR-PDU out of the payload (B3) and takes segment type ST out of this SAR-PDU (B4). The SAR-PDU receiving monitor table is retrieved by use of VPI, VCI, thus taking out the reassembly status (B5). That is, there are read status parts of the monitor table 3, which correspond to VPI, VCI of the headers of the ATM cell.

Checked subsequently is whether or not the reassembly statuses is empty (B6). That is, the in-reassembly status is set in the status part of the monitor table 3. If not the in-reassembly-status, i.e., if empty, whether or not the segment type ST of SAR-PDU indicates the head is checked (B7). If not the head cell (BOM), the AAL reassembly process is carried out (B10).

Further, in the case of the head cell (BOM), the reassembly status of the SAR-PDU receiving monitor table is set as the in-reassembly status (B8). That is, the in-reassembly status is set in the status part of the monitor table 3. Then, the timer registration is performed based on a monitor timer value of the SAR-PDU receiving monitor table (B9). That is, a timer value corresponding to the maximum allowable time from the receipt of the head cell to the receipt of the last cell is set in the timer value part of the monitor table 3.

Further, when the in-reassembly status is set in a corresponding-to-VPI/VCI status part, that is, when having already received the head cell (BOM), there is checked whether or not the segment type ST of SAR-PDU indicates the last cell (EOM) (B11). If not the last cell (EOM), the operation shifts to the AAL reassembly process (B10). In the case of the last cell (EOM), the SAR-PDU receiving monitor timer is canceled (B12). That is, the timer value set in the timer value part of the monitor table 3 is cleared.

Then, after the timer value corresponding to the maximum allowable time from the receipt of the head cell to the receipt of the last cell has been set in the timer value part of the monitor table 3, the cell loss is to be detected in accordance with the same flow as the flowchart shown in FIG. 6. When detecting the cell loss, the OAM cell is sent to the transmitting party.

Figure 8:
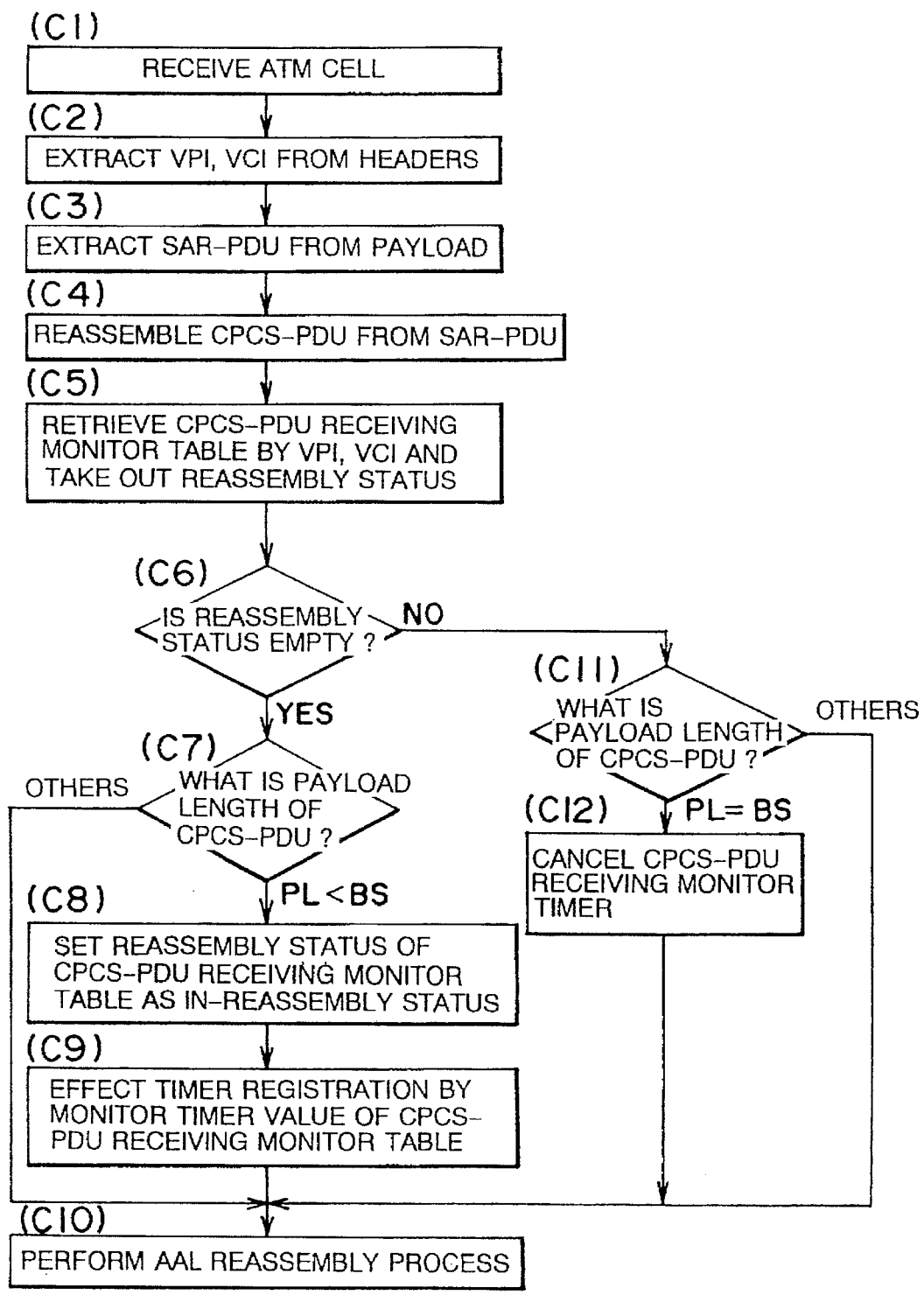
FIG. 8 is a flowchart in a third embodiment of the present invention.

FIG. 8 is a flowchart in a third embodiment of the present invention but illustrates a case where a payload length of CPCS-PDU of the above-mentioned AAL type 3/4. The receiving unit receives the ATM cell (C1) and extracts VPI, VCI from the headers of the ATM cell (C2). Then, the receiving unit extracts SAR-PDU out of the payload (C3) and assembles CPCS-PDU from this SAR-PDU (C4). Then, the CPCS-PDU receiving monitor table is retrieved by use of VPI, VCI, thus taking out the reassembly status (C5). That is, there are read contents of the status parts of the monitor table 3, which correspond to VPI, VCI of the headers of the ATM cell. Then, whether the reassembly status is empty or not is checked (C6). Namely, there is checked whether or not the in-reassembly status is set in the status part of the monitor table 3. If not the in-reassembly status, viz., if empty, there is determined whether or not the payload length PL of CPCS-PDU is smaller than the buffer size BS (C7). If PL<BS, this is the time when the head cell is received and is the case where the intermediate cell exists. Hence, the reassembly status of the CPCS-PDU receiving monitor table is set as the in-reassembly status (C8). Besides, the timer registration is performed based on the monitor timer value of the CPCS-PDU receiving monitor table (C9), and the AAL reassembly process is carried out (C10). Further, if PL<BS is not established, the operation shifts to the AAL reassembly process (C10).

Further, in the case of the in-reassembly status in step (C6), there is determined whether or not the payload length PL of CPCS-PDU is equal to the buffer size BS (C11). If equal, this implies that the last cell has been received, and hence the CPCS-PDU receiving monitor timer is canceled (C12). Whereas if not equal, this implies that the last cell is not yet received, and, therefore, the operation shifts to the AAL reassembly process (C10).

Figure 9:
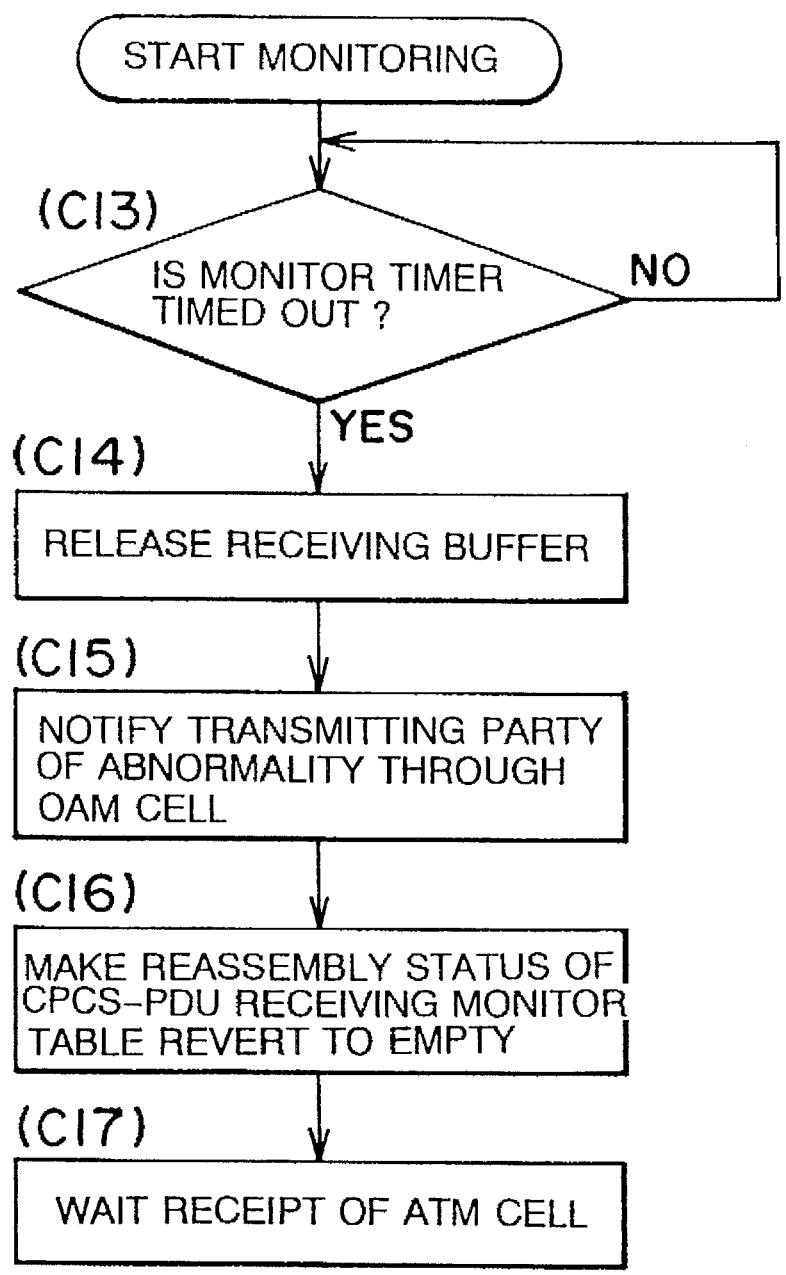
FIG. 9 is a flowchart when detecting the cell loss in the third embodiment of the present invention.

FIG. 9 is a flowchart in the case of detecting the cell loss in the third embodiment of the present invention. Checked is whether the monitor timer is timed out or not (C13). That is, the timer value corresponding to the maximum allowable time is set in the timer value part of the monitor table 3 on the basis of the buffer size BASize of CPCS-PDU, and whether or not it is a timeout by decrementing with a fixed period.

If timed out, the receiving buffer is released (C14). More specifically, this indicates a case where the ATM cell could not be received within the set time so as to provide a payload length indicated by the buffer size BASize. The determination is therefore such that the cell loss is detected, and the areas secured in the buffer memory 2 are released. Then, the transmitting party is notified of the abnormality through the OAM cell (C15), and, the reassembly status of the CPCS-PDU receiving monitor table reverts to the empty status (C16). Then, there is a wait for receiving the ATM cell (C17).

Figure 10A:
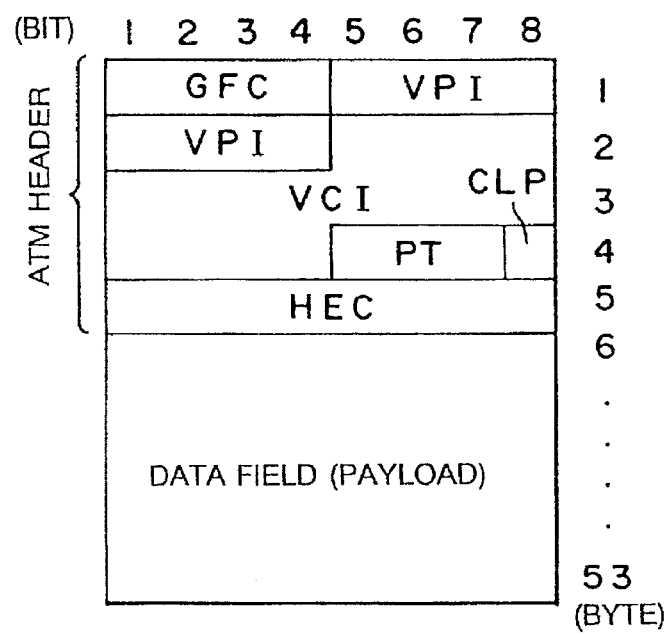
FIG. 10 is a receiving monitor explanatory diagram of an ATM cell and an AAL type 5 as well.
Figure 10B:
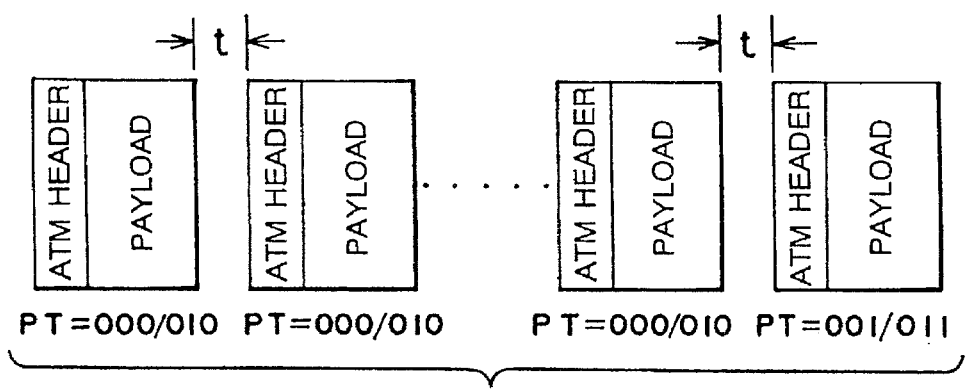
Figure 10C:
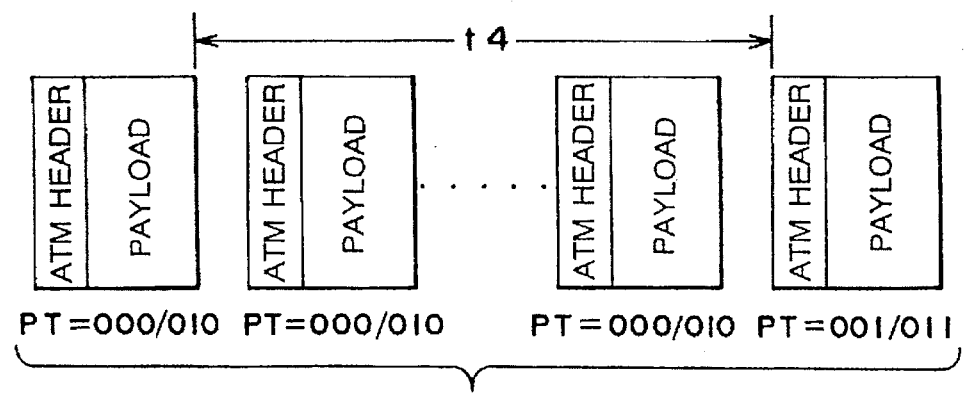

FIG. 10 is a receiving monitor explanatory diagram in the AAL type 5 as well as in the ATM cell, wherein the ATM cell indicates a case of a user network interface (UNI) and has a 53-byte structure consisting of a 5-byte ATM header and a 48-byte data field. The ATM header is composed of a 4-bit generic flow control, an 8-bit virtual path identifier, a 16-bit virtual channel identifier, a 3-bit payload type PT (payload type), a 1-bit cell loss priority indication CLP and an 8-bit header error control HEC.

The AAL type 5 is, as explained in FIG. 2, structured not by adding the headers to CPCS-PDU and SAR-PDU but by adding the ATM header when forming the ATM cell. Further, according to the payload type PT, the user data cell is indicated by "000"–"011"; the OAM cell is indicated by "100", "101"; "110" is for a resource management; and "111" is preparatory. Then, as a user-to-user indication of the ATM layer; "000", "010" indicate the head cell or the intermediate cell; and "001", "011" indicate the last cell. Accordingly, the control unit 1 is capable of determining whether or not it is the last cell according to the payload type PT of the ATM header.

Then, as illustrated below in FIG. 10, there is monitored a receiving interval t till the last cell (PT=001/011) is received by use of a receiving interval t between the payload type PT of the ATM header and the ATM cell. Even if over the maximum allowable time, and when the next ATM cell can not be received, it is possible to make such a determination that the cell loss is detected.

Monitored also is a time t4 from the receipt of the head cell to the receipt of the last cell (PT=001/011). Even if over the maximum allowable time, and when the last cell can not be received, it is feasible to make the determination that the cell loss is detected.

Figure 11:
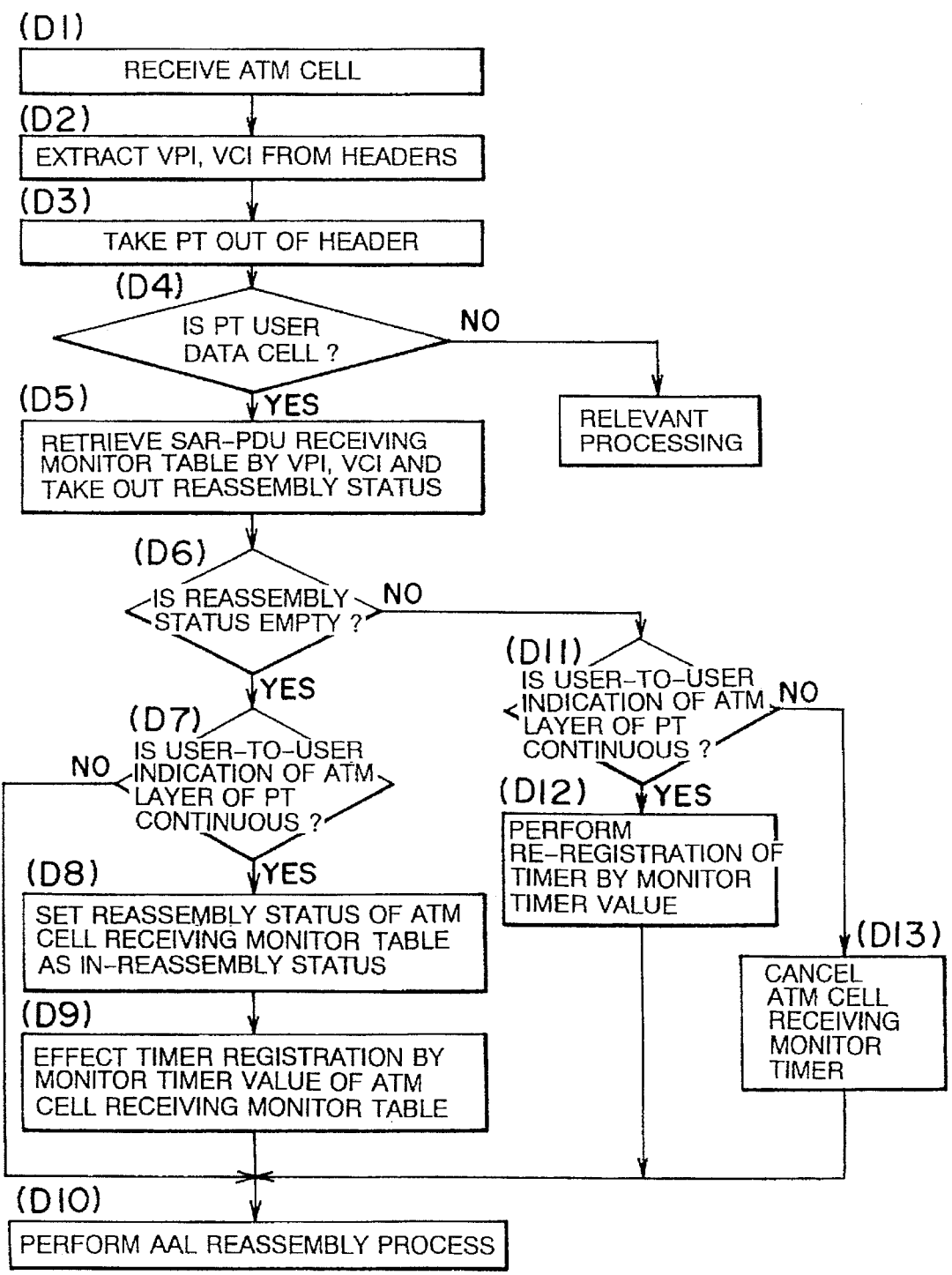
FIG. 11 is a flowchart in a fourth embodiment of the present invention.

FIG. 11 is a flowchart in a fourth embodiment of the present invention. The ATM cell is received (D1), and VPI, VCI are extracted from the headers (D2). Besides, the payload type PT is taken out (D3). Whether or not this payload type PT is the user data cell is determined (D4), and, as stated above, it follows that a relevant process expressed by the payload type PT because of the values other than "000"–"011" not indicating the user data cell. Further, in the case of the user data cell, the SAR-PDU receiving monitor table is retrieved by use of VPI, VCI, thus taking out the reassembly status (D5). Then, there is checked whether the reassembly status is empty or not (D6). That is, the monitor table 3 is retrieved by use of VPI, VCI, and there is checked whether or not the in-reassembly status is set in the status part of the corresponding area.

If the reassembly status is empty, there is checked whether or not the user-to-user indication of the ATM layer of the payload type PT shows a continuance (D7). That is, whether PT=000/010 is established or not is determined. When PT=001/011, this indicates a sole cell because of the fact that the last has been received before receiving a continuance cell, and the operation shifts to the AAL reassembly process (D10).

Further, if PT=000/010 indicates the continuance cell, the reassembly status of the ATM cell receiving monitor table is set as the in-reassembly status (D8), and the timer registration is made based on the monitor timer value of the ATM cell receiving monitor table (D9). Namely, the in-reassembly status is set in the status part of the monitor table 3, while the timer value corresponding to the maximum allowable time of the ATM cell receiving interval t is set in the timer value part.

Further, in step (D6), when the in-reassembly status is set in the status part of the monitor table 3, i.e., when the continuance cell is previously received, there is checked whether or not the user-to-user indication of the ATM layer of the payload type PT shows the continuance cell from PT=000/010 (D11). When indicating the continuance cell, the re-registration of the timer is performed based on the monitor timer value (D12). That is, the timer value is reset in the timer value part of the monitor table 3. Further if not the continuance cell, the last cell is indicated from PT=001/011, and, hence, the ATM cell receiving monitor timer is canceled (D13). That is, the timer value part of the monitor table 3 is cleared.

Figure 12:
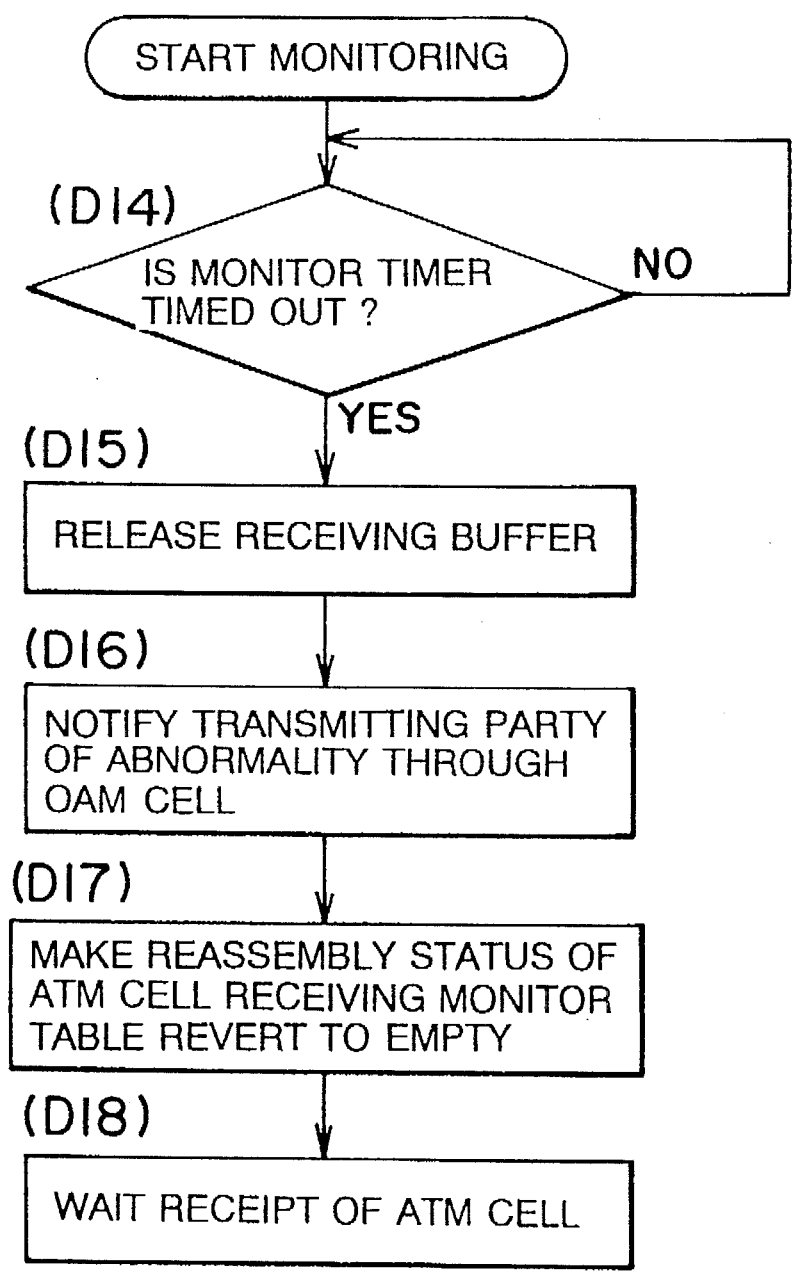
FIG. 12 is a flowchart when detecting the cell loss in a fourth embodiment of the present invention.

FIG. 12 is a flowchart when detecting the cell loss in a fourth embodiment of the present invention. Whether or not the monitor timer is timed out is checked (D14), and, if timed out, the receiving buffer is released (D15). Namely, the timer value set in the timer value part of the monitor table 3 is decremented with a fixed period, and, when the timer value comes to zero, this indicates a timeout, with the result that the areas secured in the buffer memory 2 are released. Then, the control unit 1 notifies the transmitting party of an abnormality through the OAM cell (D16), and the reassembly status of the ATM cell receiving monitor table reverts to the empty (D17). Then, there is a wait for receiving the ATM cell (D18). Namely, the in-reassembly status set in the status part of the monitor table 3 is cleared.

Figure 13:
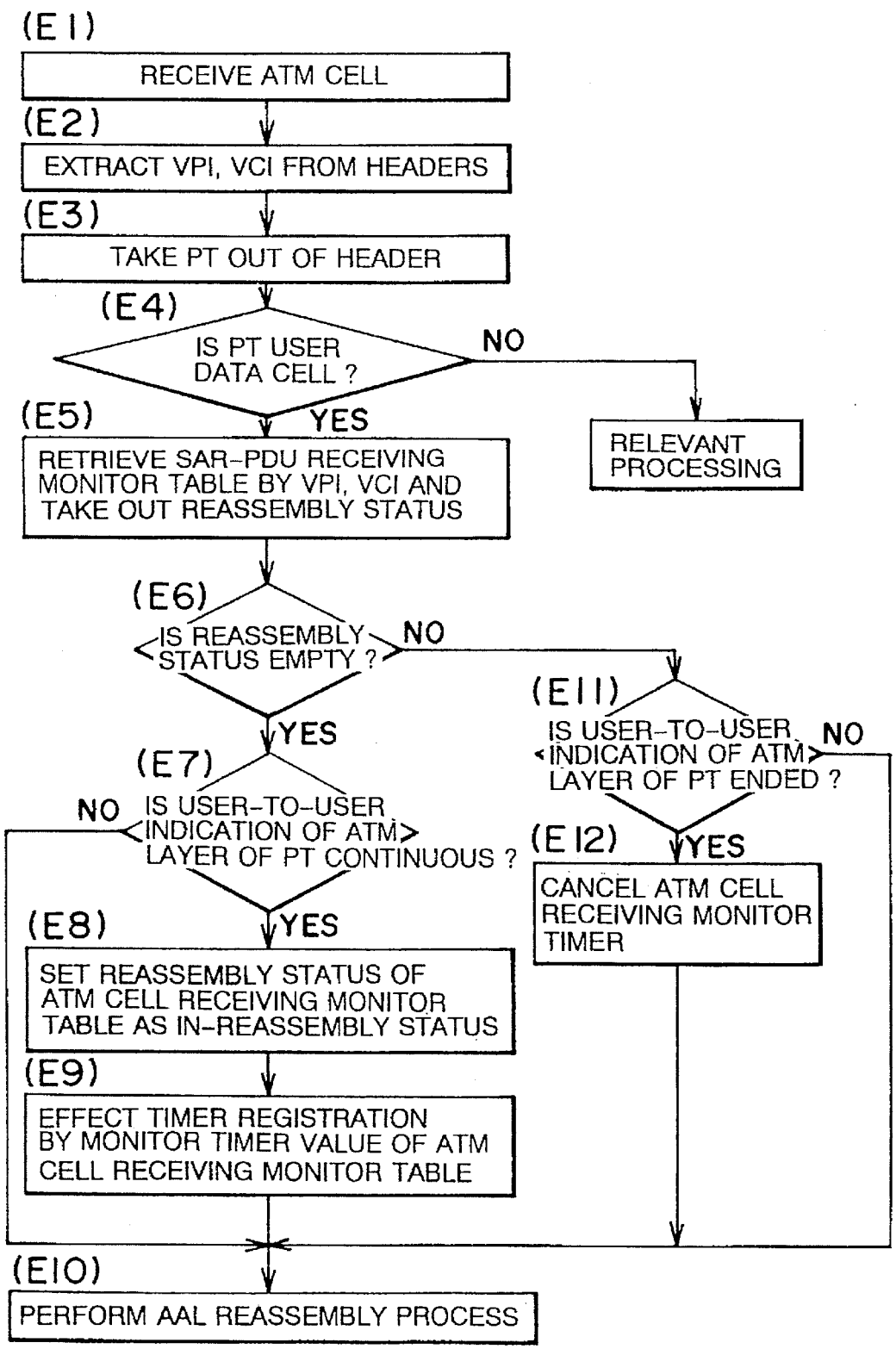
FIG. 13 is a flowchart in a fifth embodiment of the present invention.

FIG. 13 is a flowchart in a fifth embodiment of the present invention. Steps (E1)-(E10) are the same as steps (D1)-(D10) of the flowchart of FIG. 11 in the fourth embodiment of the present invention. VPI, VCI, PT of the ATM headers are taken out, and, in the case of the user data cell, whether in the in-reassembly status or not is checked. If not the in-reassembly status, and when indicating the last cell, a determination can be such that it is the sole cell. When showing the continuance cell, a determination can be also such that it is the head cell.

Further, in step (E6), if determined to be in the in-reassembly status, there is checked whether or not the last cell is indicated from PT=001/011 (E11). If not the last cell, the operation shifts to the AAL reassembly process (E10). In the case of the last cell, the ATM cell receiving monitor timer is canceled (E12). Further, the processes of detecting the cell loss will be done according to the flowchart of FIG. 12, and, when detecting the cell loss, the transmitting party is notified of an abnormality through the OAM cell.

The embodiments discussed above can be also combined. Monitored, for example, are both of the receiving interval of the ATM cell and the time from the receipt of the head cell to the receipt of the last cell, and, when the next ATM cell or the last cell can not be received individually in excess of the maximum allowable time, it is possible to determine that the cell loss is detected. Further, the timer in that case may entail applications of a variety of constructions of an already-known counter, etc..

As discussed above, according to the present invention, in the receiving unit for receiving and processing the ATM cell in the ATM switching system, the control unit 1 discriminates whether or not it is the last cell in accordance with the segment type ST or the payload type PT of the ATM header. The receiving time from the receipt of the head cell to the last cell or the cell-to-cell receiving time is monitored by use of the monitor table 3. When the last cell can not be received even if over the set maximum allowable time, or when the next cell can not be received even if over the maximum allowable time, the determination is that the cell loss is detected, and the buffer memory 2 is released. The cell loss is detected in a shorter time than in the case of detecting the cell loss with the high-order application, and, besides, it is possible to eliminate an invalid holding. Further, the transmitting party can be notified of the abnormality through the OAM cell, wherein the cell is lost or disposed of. Accordingly, the retransmitting process can be easily executed.

It is apparent that, in this invention, a wide range of different working modes can be formed based on the invention without deviating from the spirit and scope of the invention. This invention is not restricted by its specific working modes except being limited by the appended claims.

What is claimed is:

1. An ATM switching equipment comprising:
   segmenting/reassembling means for segmenting an ATM cell received and reassembling it into frame data;
   a buffer memory for temporarily storing the reassembled frame data;
   discriminating means for discriminating whether the received cell is an intermediate cell or a last cell;
   monitoring means for monitoring a cell-to-cell receiving time or a receiving time between a head cell and the last cell; and
   releasing means for determining that a cell loss is detected when the receiving time exceeds a set time and releasing said buffer memory.

2. An ATM switching equipment according to claim 1, wherein said discriminating means discriminates whether the received cell is the head cell or the intermediate cell or the last cell in accordance with a segment type in a header of a cell segmentation and reassembly sublayer-protocol data unit (SAR-PDU) of an ATM adaptation layer (AAL).

3. An ATM switching equipment according to claim 1 or 2, wherein said monitoring means determines that the cell loss is detected when the last cell has not been received after such a last-cell-receivable set time since the head cell has been received, and
   said releasing means releases said buffer memory on the basis of the determination about the detection of the cell loss.

4. An ATM switching equipment according to claim 1, wherein said monitoring means determines a set time on the basis of a buffer allocation size indication (BASize) in a header of a common part convergence sublayer-protocol data unit (CPCS-PDU) and, if over the set time, determines that the cell loss is detected when the receipt completion can not be done upon receiving the last cell.

5. An ATM switching equipment according to claim 1, wherein said monitoring means monitors a cell-to-cell receiving time till a user-to-user indication based on a payload type of an ATM header of the cell shows the last cell and, if over the set time, determines that the cell loss is detected when a next cell can not be received.

6. An ATM switching equipment according to claim 1, wherein said monitoring means monitors a receiving time till the last cell is indicated since the user-to-user indication based on the payload type of the ATM header of the cell has shown a continuance cell and, if over the set time, determines that the cell loss is detected when the last cell can not be received.

7. An ATM switching equipment according to claim 1, further comprising abnormality notifying means for notifying a cell transmitting party of a receiving abnormality through an operation/administration/maintenance cell when said monitoring means determines that the cell loss is detected.

8. A communication equipment comprising:

segmenting/reassembling means for segmenting a cell received and reassembling it into frame data;

storing means for temporarily storing the reassembled frame data;

discriminating means for discriminating whether the received cell is an intermediate cell or a last cell;

monitoring means for monitoring a receiving time between a cell and a cell or a receiving time between a head cell and the last cell; and releasing means for determining that cell loss is detected when the receiving time exceeds a set time and releasing said buffer memory.

* * * * *